Figure 1:
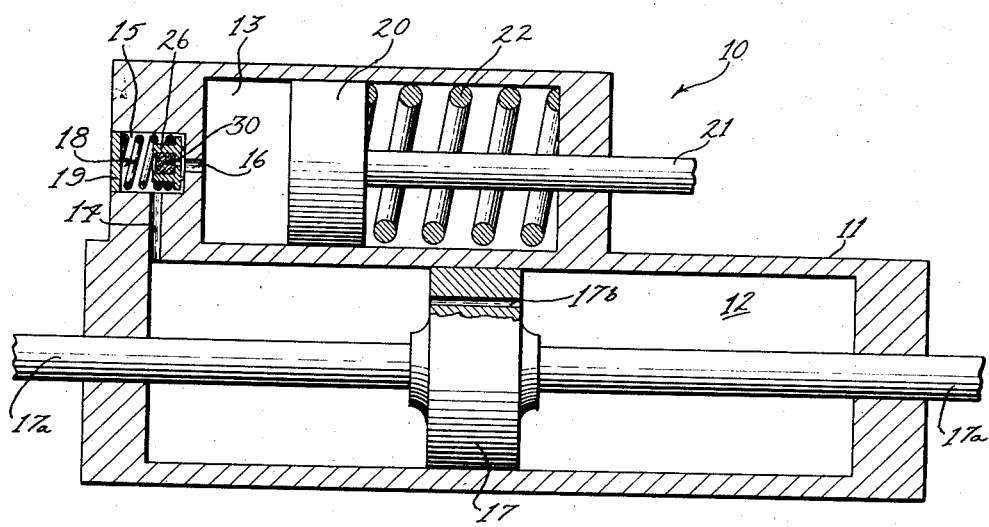

Sept. 23, 1958    W. A. KUHN, JR    2,853,159
DASHPOT WITH POROUS METAL VALVE
Filed Dec. 14, 1954

Inventor
William A. Kuhn Jr.

United States Patent Office 2,853,159
Patented Sept. 23, 1958

2,853,159

DASHPOT WITH POROUS METAL VALVE

William A. Kuhn, Jr., Detroit, Mich., assignor to Houdaille Industries, Inc., Detroit, Mich., a corporation of Michigan Application December 14, 1954, Serial No. 475,231

3 Claims. (Cl. 188—94)

The present invention relates to a new and improved thermal relief and air bleed check valve for flutter dampers or the like.

A major problem encountered in the use of flutter dampers in aircraft has been the drastic changes in temperature to which such flutter dampers may be subjected at the various speeds and altitudes at which present high speed aircraft often operate.

The general structure of most flutter dampers employed in aircraft to minimize flutter or shimmy of a movable control surface, such as an aileron or the like, usually comprises a working chamber in which a fluid moving member operates to displace hydraulic fluid, and a reservoir or replenishing chamber in which is stored reserve hydraulic fluid. The reserve fluid is fed to the working chamber as the fluid supply therein diminishes with use. To this end means are usually provided to maintain the reserve fluid under pressure in the replenishing chamber and the pressurized hydraulic fluid is fed to the working chamber via a check valve. These check valves, however, are adapted to permit unidirectional fluid flow only from the reservoir to the working chamber; the valve not being adapted to allow reverse flow.

During operation of a flutter damper the temperature of the damper unit increases, particularly at high aircraft speeds. When this occurs cold hydraulic fluid in the working chamber expands at the resulting increased temperatures. The unidirectional fluid flow structure of conventional check valves, however, prevents the expanding fluid from overflowing into the reservoir or replenishing chamber. Consequently, increased or hypernormal fluid pressures are developed within the working chamber which, if not relieved, may cause the walls of the working chamber to rupture.

In accordance with the general features of the instant invention there is provided a new and improved thermal relief and air bleed check valve for hydraulic flutter dampers which acts to allow unidirectional fluid flow between a pressurized hydraulic fluid reservoir and a working chamber under normal working pressures therein, but which is so constructed as to permit limited reverse fluid flow into the reservoir when hypernormal working pressures are developed within the working chamber in order to prevent rupturing of the working chamber by hypernormal pressures; the novel means provided to allow this limited reverse fluid flow also being adapted to bleed air from the working chamber to the reservoir.

It is, therefore, an object of this invention to provide a new and improved thermal relief and air bleed check valve for a hydraulic flutter damper in which unidirectional fluid flow from a pressurized reservoir or replenishing chamber to a working chamber is permitted during operation of the flutter damper at normal working pressures and temperatures, but in which abnormally high pressures created in the working chamber are prevented from fracturing the flutter damper by novel means which permit limited reverse fluid flow into the reservoir to compensate for the increased pressures.

Another object is the provision of a thermal relief and air bleed check valve for a flutter damper in which fluid flow is controlled to be unidirectional from a reservoir to a working chamber when normal working pressures exist in the working chamber, but which allows limited reverse fluid flow when hypernormal pressures are created in the working chamber and in which means are provided for bleeding air from the working chamber to the reservoir under both normal and hypernormal working pressures.

Figure 2:
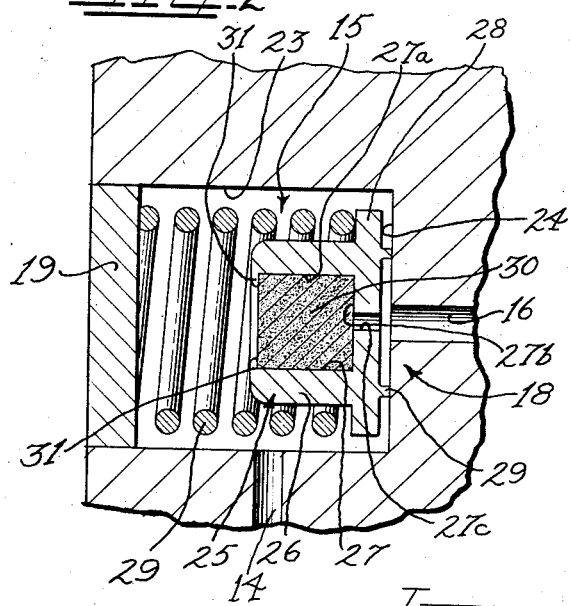

Other objects, features and advantages of the present invention will be readily apparent from the following detailed description of a preferred embodiment thereof taken in conjunction with the accompanying sheet of drawings, in which:

Figure 1 is a highly schematic, vertical, longitudinal sectional view with parts in elevation and parts in section taken through a flutter damper embodying one form of the instant invention; and Figure 2 is an enlarged, fragmentary sectional view with parts in elevation and parts in section illustrating the novel thermal relief and air bleed check valve of the instant invention.

By way of example the present invention is shown in a highly schematic manner as being embodied in a flutter damper, or the like, shown generally at 10, comprising a housing 11 which defines a cylindrical, elongated working chamber 12 and a cylindrical reservoir or replenishing chamber 13 thereabove. The working chamber 12 and the replenishing chamber 13 are in communication with one another via a passage or port 14 connecting the working chamber with a valve chamber 15, and a passage or port 16 which connects the reservoir 13 with the valve chamber 15.

A fluid moving member 17 is adapted for fluid displacement disposition within the working chamber 12. It is to be noted that the fluid moving member 17 shown in Figure 1 is a highly schematic representation of any one of several types of fluid moving members adapted for operation in a hydraulic flutter damper or similar construction. That is, it denotes a member to which a rapid change in movement is transmitted by means of suitable rods and connections 17a, and which absorbs such movement or shock by displacing hydraulic fluid through a reduced diameter passage or orifice, such as 17b. It will be apparent that the general function of the fluid moving member 17 is equally applicable to flutter dampers or shock absorbers in general, whether they be of the rotary vane piston type or of the telescopic or direct action type.

Reserve hydraulic fluid retained within the reservoir or replenishing chamber 13 is adapted to be maintained under constant pressure. To this end a piston 20, having an outwardly projecting stem or rod 21 is slidably axially movable within the working chamber 13. A coil compression spring 22 provides biasing means for continually normally urging the piston toward the passage 16.

The valve chamber 15, which includes a cylindrical side wall 23 and a bottom wall 24, is adapted to receive means for controlling hydraulic fluid flow between the reservoir 13 and the working chamber 12 under varying pressure conditions. Such means include a check valve 25 having a generally cylindrical valve body 26. The valve body 26 is provided with an axial stepped bore 27 therethrough and includes an outer enlarged diameter portion 27a, an annular retaining shoulder 27b and an inner reduced or smaller diameter portion or metering port 27c communicating with the passage 16.

An axially projecting integral annular sealing ring surface or seat 29 is provided on the inner marginal surface of the valve body 26 and is adapted to be constantly urged into sealing engagement with the end wall 24 by a coil compression spring 29 seated on an integral lateral annular flange 28 and against the inner surface of a closure cap or plug 19, which seals the valve chamber 15.

A generally cylindrical porous insert or plug 30 is carried in the outer, enlarged axial bore 27a of the valve body 26 and is held in tight fitting relationship therewith by an annular radially inwardly extending retaining flange 31 formed on the outer marginal edge of the valve body 26.

The porous plug 30 provides means for allowing limited reverse fluid flow from the working chamber 12 to the reservoir or replenishing chamber 13 under hypernormal working pressure conditions in the working chamber 12 as will be explained more fully hereinafter.

In accordance with the features of the instant invention the check valve 25 is adapted to allow unidirectional hydraulic fluid flow from the reservoir 13 to the working chamber 12 when normal working pressures exist within the working chamber 12. Under normal pressure conditions wherein the working chamber has an adequate supply of hydraulic fluid the pressure within the working chamber 12 is greater than the pressure exerted upon the hydraulic fluid in the reservoir 13 by the piston 20 and, accordingly, the check valve 25 will be held with its annular seat or seal 29 in tight fitting relationship against the wall 24 of the valve chamber 15 by means of the coiled compression spring 29 to thereby prevent fluid flow from the reservoir to the working chamber. The porous insert or plug is such that the porosity thereof will not permit hydraulic fluid flow therethrough under the normal pressures and hydraulic fluid viscosities created in the working chamber 12 or the chamber 15.

When the oil in the working chamber 12 has been depleted to such an extent that the pressure therein drops below the pressure in the reservoir 13, the pressure exerted by the piston 20 on the hydraulic fluid in the reservoir 13 will cause the valve 25 to open against spring pressure and allow hydraulic fluid to be fed to the working chamber 12 via the passages 14 and 16 and the valve chamber 15.

Under hypernormal internal pressure conditions, that is, when pressures within the working chamber greatly exceed normal working pressures, such as may be caused by cold hydraulic fluid being raised to high temperatures with corresponding expansion, the sintered porous insert 30 in the valve body 26 provides means to allow limited reverse flow from the working chamber 12 to the reservoir 13. To this end, the insert 30 has a porosity such that normal working pressures will not be great enough to force hydraulic fluid at normal working viscosity through the insert, while hypernormal pressures and lower viscosity of the fluid will result in backup or return passage of the fluid through the insert 30 into the reservoir 13. In addition the restricted size of the metering port or orifice 27c restricts reverse flow of hydraulic fluid; coacting with the porosity properties of the insert 30 to minimize the possibility of flow back therethrough under normal working viscosity conditions. In this manner it is possible to relieve internal pressures to prevent rupturing of the housing 11 which might otherwise occur when the fluid in the working chamber expands to an excessive degree.

Another distinctive feature of the porous sintered plug 30 is that it allows air, which may be worked out of the hydraulic fluid in the working chamber 12, to bleed through its porous body into the reservoir 13. In this manner the porous plug 30 effectively minimizes the possibility of air block formation in the working chamber 12 which could otherwise, seriously affect the efficiency of the flutter damper 12.

The porous plug 30 may be produced from a variety of self-sustaining pressure-resistant porous materials, such as sintered powdered metals, various refractories, sintered glass and the like. Preferably, however, it is produced by powdered metallurgy techniques, such as pressure molding or compacting suitable powdered metals and, sintering the resulting compact to a desired porosity and strength.

It will, of course, be appreciated that the exact type of metal used; the pressures employed in compacting; sintering times and temperatures; and other considerations will all depend upon the degree of porosity desired in the plug 30. In turn, the porosity may vary with the size and potential pressure load of the particular flutter damper for which the plug 30 is intended as well as the viscosity ranges of the hydraulic fluid employed in the damper.

It will be appreciated by those skilled in the art that the present invention provides means for eliminating the possibility of rupturing a flutter damper housing due to greatly increased pressures in a working chamber resulting from heating and expansion of the hydraulic fluid therein. It will also be apparent that means for eliminating such possibility of rupturing is provided in an economical and simple manner in the form of the porous plug 30, which successfully minimizes the necessity of providing expensive blow-off valves or the like.

It will also be appreciated that the plug 30 now provides an efficient air bleed means integral with the check valve in such a manner that elimination of air from the working chamber is effected efficiently and automatically during operation of the flutter damper at both normal and abnormal pressures.

It will be understood that modifications and variations may be effected without departing from the scope of the novel concepts of the present invention.

I claim as my invention:

1. In a damper including a damping chamber having a damping piston movable therealong and a fluid replenishing chamber replenishing fluid to said damping chamber under pressure, a passageway from said fluid replenishing chamber to said damping chamber having a check valve therein biased to accommodate the flow of fluid from said replenishing to said damping chamber and to block the back flow of fluid from said damping to said replenishing chamber, said check valve including a porous metal plug affording communication from one side of said valve to the other and being sufficiently impervious to the passage of fluid through said plug to prevent the flow of fluid from said damping to said replenishing chamber under normal damping pressures and to accommodate the flow of fluid from said damping to said replenishing chamber under hypernormal working pressures within said damping chamber.

2. In a vibration damper, a housing having a damping chamber therein having a damping piston movable along said damping chamber in response to vibratory movement, a fluid replenishing chamber, a communicating passageway between said fluid replenishing chamber and said damping chamber, a spring biased piston in said fluid replenishing chamber pressurizing hydraulic fluid therein and supplying hydraulic fluid from said replenishing chamber to said damping chamber, said communicating passageway having a check valve chamber therein, a check valve in said check valve chamber, a spring biasing said check valve to accommodate the flow of hydraulic fluid from said replenishing to said damping chamber and to prevent the back flow of fluid from said damping chamber to said replenishing chamber, said check valve having a stepped bore therethrough, the larger diameter portion of said bore having a porous metal body disposed therein, said porous metal body being sufficiently impervious to the passage of fluid therethrough to block the back flow of damping fluid from said damping chamber to said replenishing chamber under normal pressure conditions in said damping chamber and to accommodate the relief of hypernormal pressures in said damping chamber by the bleeding of fluid therethrough to said replenishing chamber.

3. In a damper check valve and in combination with a damper having a damping chamber having a piston movable therealong in response to vibratory movements and having a reservoir for damping fluid having a pressurized piston therein for replenishing fluid in said damping chamber, a passageway between said reservoir and said damping chamber having a check valve chamber therein, a check valve in said check valve chamber having a disk-like valve face, a spring biasing said check valve to block the back flow of damping fluid to said reservoir, said check valve having a cylindrical wall extending downstream from said valve face and having a central passageway leading through said valve face for bleeding damping fluid back to said reservoir, and a sintered metal plug contained within said cylindrical wall and sufficiently impervious to the passage of fluid to prevent the flow of damping fluid from said damping chamber to said reservoir through said central passageway leading through said valve face under normal damping pressures, and to accommodate the bleeding of damping fluid back to said reservoir under excessive damping pressure conditions.

References Cited in the file of this patent

UNITED STATES PATENTS

| | | |
|---|---|---|
| 2,419,651 | Magrum | Apr. 29, 1947 |
| 2,635,715 | Riedel et al. | Apr. 21, 1953 |
| 2,676,613 | Baxter | Apr. 27, 1954 |
| 2,679,729 | Swift | June 1, 1954 |
| 2,689,916 | Lohman et al. | Sept. 21, 1954 |
| 2,714,429 | Etherton | Aug. 2, 1955 |